March 31, 1959

G. L. CONGDON ET AL 2,879,509

POWER NAILING MACHINES

Filed April 16, 1956

INVENTORS
GEORGE L. CONGDON
BY ALAN R. HANSON
FRANK E. BARTA

ATTORNEYS

United States Patent Office 2,879,509
Patented Mar. 31, 1959

2,879,509

POWER NAILING MACHINES

George L. Congdon, Frank E. Barta, and Alan R. Hanson, Minneapolis, Minn., assignors, by mesne assignments, to United Shoe Machinery Corporation, Flemington, N.J., a corporation of New Jersey Application April 16, 1956, Serial No. 578,272

28 Claims. (Cl. 1—1)

This invention relates to new and useful improvements in automatic power nailing machines, and more particularly to such machines which utilize a pressure fluid, such as compressed air, for operating its various mechanisms.

An important feature of the present invention is to provide a mobile nailing machine which is positive and efficient in operation, and which is capable of driving nails of various sizes, means being provided therein for quickly adjusting the nail feeding means from one size of nail to another without the use of separate tools.

A further object of the invention is to provide a nailing machine comprising a novel supporting tubular skeleton frame constructed of pipe and including a pair of tubular side members which serve to provide independent air chambers or reservoirs having connections with a common source of fluid pressure, said frame members, in addition to providing a supporting structure for the various mechanisms of the machine, having their upper portions formed to provide a pair of handles to facilitate transporting the machine from one place to another, and said handle portions also serving to provide a support for the flexible connections or hoses which operatively connect the driving head or tool to the machine.

A further object is to provide a nailing machine comprising a pivotally mounted hopper into which the nails are delivered in bulk, and means being provided at one end of the hopper for guiding the nails therefrom into a nail-feeding mechanism which automatically delivers the nails, one at a time, from the guiding means into a flexible tube or hose having a connection with a source of fluid pressure, whereby each nail delivered into said tube is forced therethrough into the nail chuck of the driving head or tool in position to be driven into the work, the entire operation of the machine being controlled by the simple manipulation of the trigger of the driving head.

A further object is to provide a nailing machine comprising a hopper mounted for pivotal movement by a unique pneumatically operated self-contained mechanism including a cylinder having a piston mounted for reciprocal movement therein, and a concealed valve mechanism being mounted within the base of the cylinder and having a connection with a source of pressure fluid, said valve mechanism being automatically operable to intermittently direct the pressure fluid against the piston whereby the piston is automatically reciprocated within the cylinder, thereby to oscillate the hopper constantly during operation of the machine and thus prevent the nails from becoming clogged in the guideways which conduct the nails from the supply hopper to the operating mechanisms of the machine.

A further object of the invention is to provide a nailing machine comprising a guideway for conducting the nails from the discharge end of the nail-supporting hopper into a position to be engaged by a picker bar which successively delivers the nails to a nail ejector device which ejects the nails, one at a time, into a flexible tube or hose which conducts the nails from the machine proper to the nail-driving head or tool under fluid pressure, said picker bar being adapted to operate automatically each time the trigger of the driving head is actuated by the operator, whereby the delivery of nails from the hopper to the driving head is effected without interruption and with the assurance that each time the operator depresses the trigger to drive a nail, another nail will be delivered to the driving head for the next cycle of operation.

Other objects of the invention reside in the means provided in the discharge end of the nail-supporting hopper for preventing the nails from accumulating therein and ultimately clogging the machine; in the means provided for varying the width of the guide slot or channel conducting the nails from the hopper to the picker bar, thereby to adapt the machine for handling nails of different sizes; in the means provided for pivotally supporting the nail hopper in the machine, whereby the hopper may be quickly detached from the machine without the use of tools; in the simple one-piece construction of the nail gate which successively picks the nails from the nail guideway and deposits them, one at a time, into a nail ejector which operates in timed relation to the nail picker bar to force a nail through the nail tube to the driving head for each successive nail driving operation; in the pivotal mounting of the nail picker bar whereby it may readily be swung to an inoperative position to facilitate rotatably adjusting it to the selected nail size; in the unique construction of the driving head and the replaceable spurs on the hammer nose, which makes nailing possible from any desired angle, including toe-nailing; in the unique construction of the nailing machine as a whole, whereby it readily lends itself for manufacture in mass production; in the specific construction of the nail chuck, including the arrangement of the spurs for engaging the work during the nailing operation, and their relation to the jaws of the nail chuck; and in the general arrangement of the various mechanisms of the machine whereby the operator always has the machine under complete control, the entire operation of the machine being controlled by the simple manipulation of the single trigger provided on the driving head.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

Supporting frame

An important feature of the present invention resides in the novel construction of the main supporting frame of the nailing machine which, in addition to supporting all of the various operating mechanisms of the machine, also functions to provide a pair of independent reservoirs for storing a pressure fluid, such as compressed air, said reservoirs or air chambers having connections with a source of compressed air, utilized for operating the various mechanisms which control the delivery of nails from the nail hopper to the pneumatic nail driving tool or gun, subsequently to be described.

Figure 1:
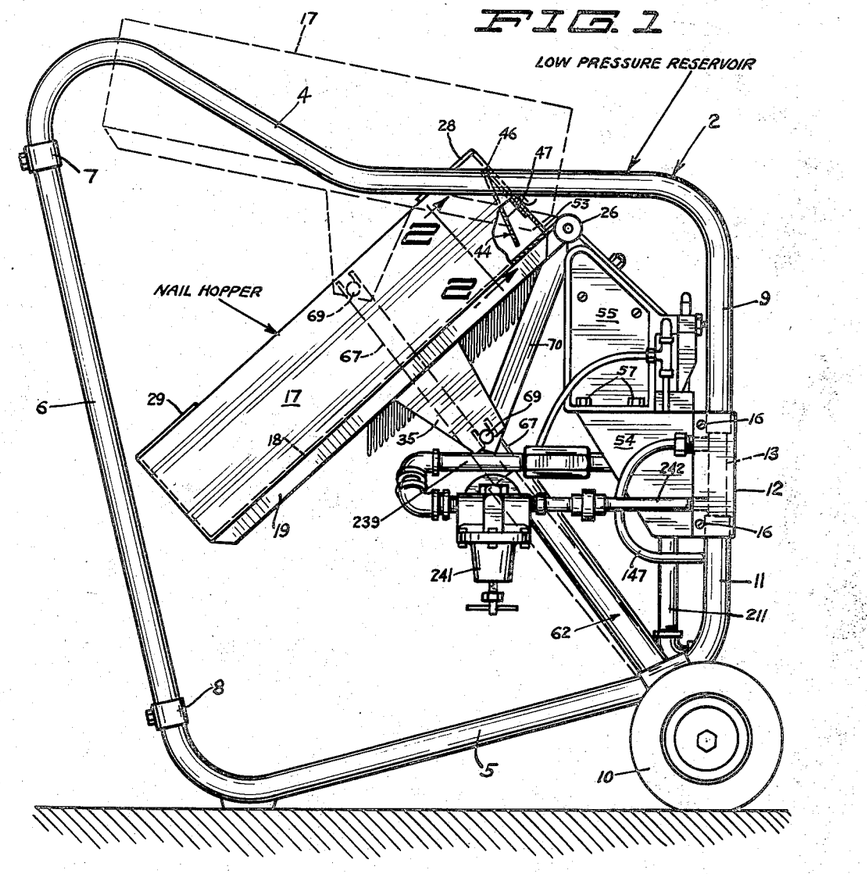
Figure 1 is a side elevation of a nailing machine embodying the invention showing in full and dotted lines the oscillatory movement of the nail hopper, and also showing the preferred configuration of the tubular side frame members of the composite machine frame.
Figures 3, 4:
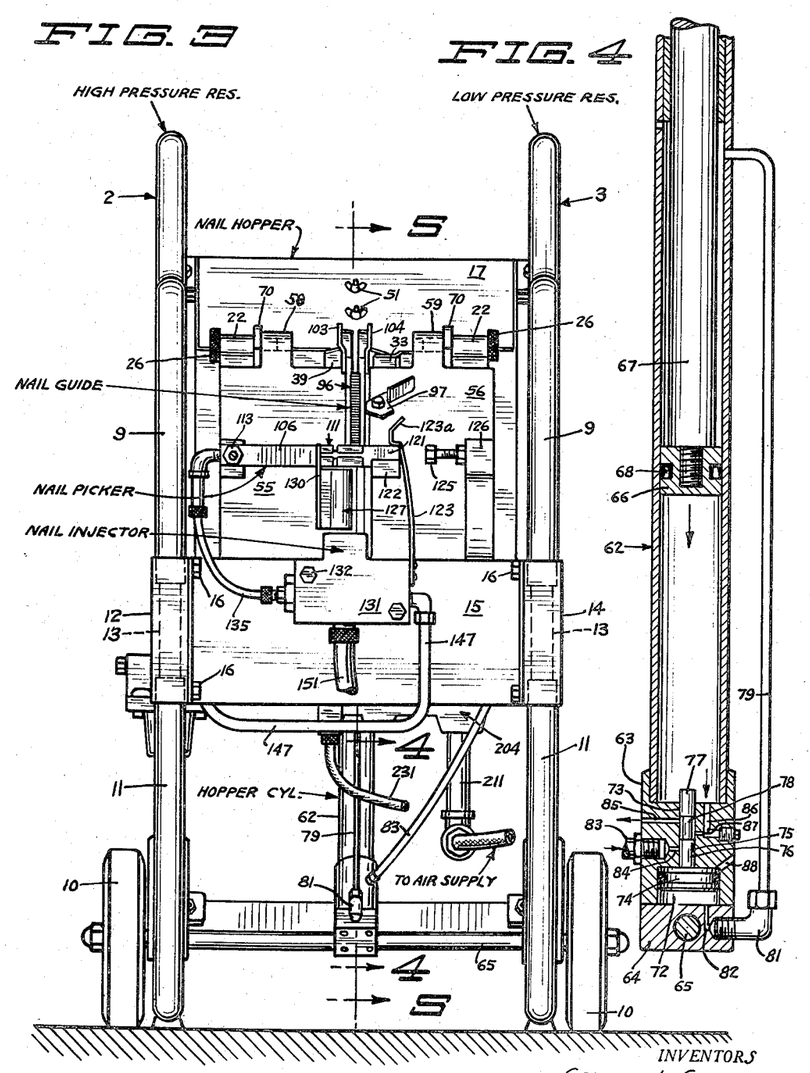
Figure 3 is a front view of the machine showing the spaced parallel tubular side frame members and the various mechanisms supported therebetween.
Figure 4 is an enlarged longitudinal sectional view on the line 4—4 of Figure 3, showing the general construction of the cylinder and piston for oscillating the nail hopper, as indicated by the full and dotted lines in Figure 1, during operation of the machine.

The skeleton supporting frame, as best illustrated in Figures 1 and 3, comprises two tubular side frame members each forming a vertically arranged closed loop, generally designated by the numerals 2 and 3. These frame members are preferably constructed of steel tubing or pipe for strength and lightness, and each may comprise top and bottom sections 4 and 5, and rear sections 6, as best illustrated in Figure 1. Tie members 7 and 8 are interposed between and suitably secured to the rear upright frame sections 6 to add rigidity and strength to the rear portion of the composite frame, as will be understood by reference to the drawings.

The front upright sections 9 and 11 of the tubular skeleton frame member 2 have their terminals fitted into and secured in sockets provided in the top and bottom ends of a coupling member 12, having a bore 13 extending lengthwise therethrough for establishing communications between the front sections 9 and 11 of frame member 2, as indicated in dotted lines. Tubular frame member 3 at the opposite side of the machine has its upright front sections 9 and 11 similarly secured to the top and bottom ends of a coupling member 14, similar to member 12. A suitable cross member, generally designated by the numeral 15, is interposed between and has its opposite ends secured to frame coupling members 12 and 14, by such means as bolts or screws 16. The supporting frame is provided with suitable carrying wheels 10 to facilitate moving the machine about from place to place.

Nail hopper and mounting therefor

Figures 5, 6, 7:
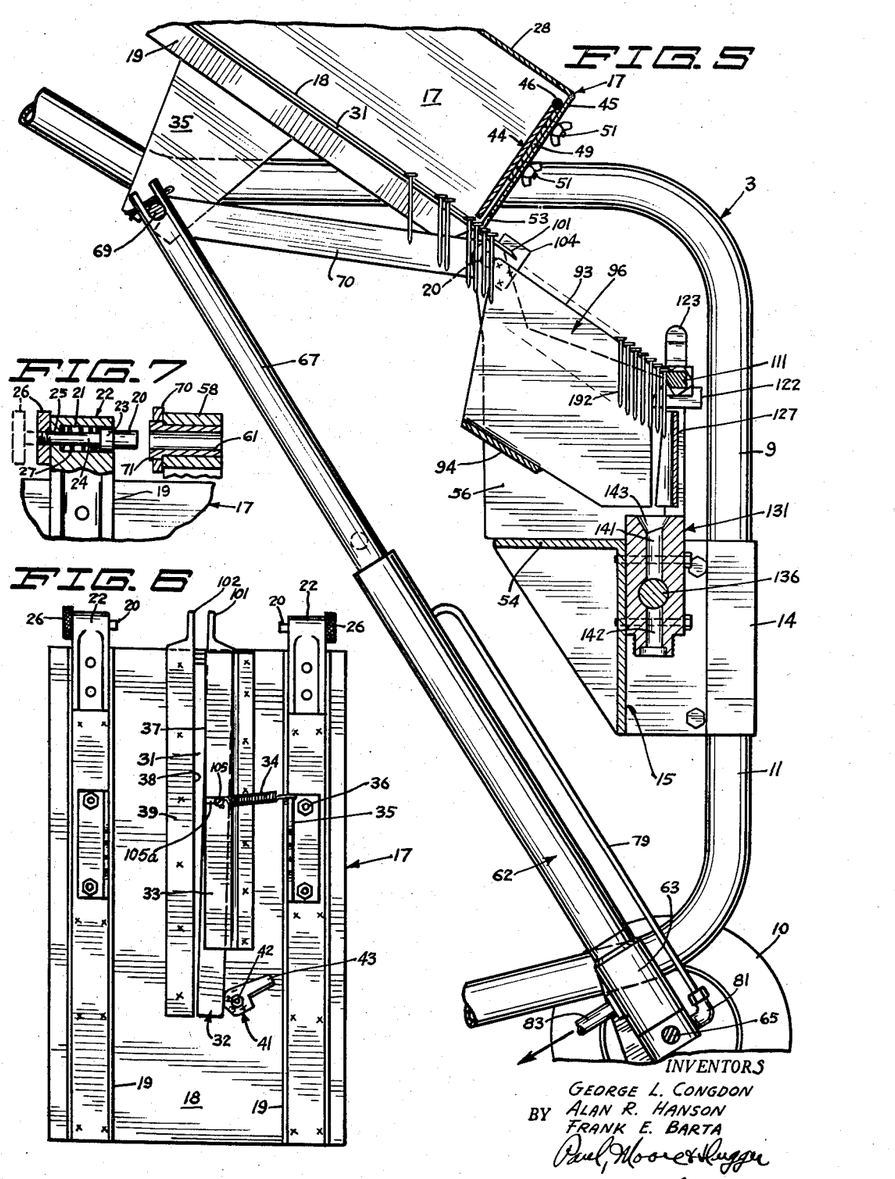
Figure 5 is an enlarged detail sectional view on the line 5—5 of Figure 3, showing the guide means provided for guiding the nails from the nail hopper to the picker bar.
Figure 6 is a bottom view of the nail hopper, showing the nail guide slot provided in the hopper bottom, and also showing the cam means for varying the width of said slot in accordance to the size of the nail to be driven.
Figure 7 is an enlarged detail sectional view illustrating the construction of the spring biased pivot elements for pivotally supporting the nail hopper in the machine frame.

The nail hopper and its mounting means is best illustrated in Figures 1, 5, 6, 7, 8 and 9, and comprises a box-like hopper 17 which, as best illustrated in Figure 6, is rectangular in configuration and preferably has an open top. The hopper 17 is shown constructed of sheet metal and has secured to its bottom wall 18, by such means as welding, a pair of reinforcing channel members 19, which preferably extend from end to end of the hopper, as best shown in Figures 1 and 6.

The hopper is mounted for pivotal movement about a horizontal axis, as seen in Figure 1. To thus mount the hopper, a pair of opposed retractable shouldered pivot pins 20 (Figure 7) are mounted for sliding movement in sockets or bores 21 provided in brackets 22 fixedly secured to the forward ends of the reinforcing channels 19. Each pivot 20 has an enlarged portion 23 slidably supported in its respective bore 21, and has a reduced extension 24 traversing a guide opening 25 in the outer end of its supporting bracket 22.

Suitable finger grips 26 are secured to the projecting ends of the pivot extensions 24, whereby the pivots 20 may readily be retracted to permit removal of the hopper from the machine frame, when necessary, as when it is desired to dump the nails therefrom, or when substituting one hopper for another containing a different size nails. Suitable springs 27 are provided in the sockets or bores 21 in which the enlarged portions 23 of the pivot pins 20 are slidably mounted. Springs 27 constantly urge the pivot pins 20 toward the positions shown in Figures 6 and 7.

The upright walls of the hopper extend from the bottom to the top thereof. Plate elements 28 and 29 are secured to the hopper walls at the front and rear ends thereof to partially close or reduce the open top of the hopper, and to prevent nails from spilling over the top of the end walls of the hopper when the hopper is oscillated between the full and dotted line positions shown in Figure 1, during operation of the nailing machine. The plate elements 28 and 29 may, if desired, be made integral with their complemental end walls of the hopper. A fastener or nail guide slot, generally designated by the numeral 31, is provided in the bottom wall 18 of the hopper and extends rearwardly from the front end of the hopper to a point substantially midway of the length of the hopper.

Figure 2:
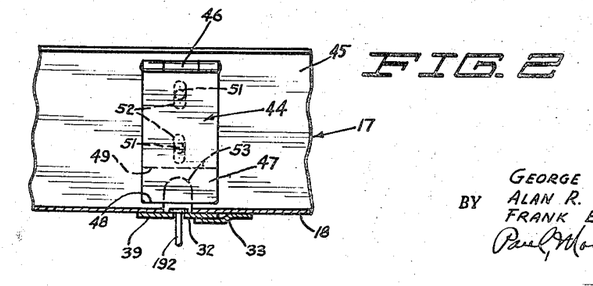
Figure 2 is a fragmentary sectional view on the line 2—2 of Figure 1, showing the pivotally mounted plate for preventing bridging of the nails at the discharge end of the hopper.

Means is provided for varying the width of the slot 31 in accordance with the size of nails to be dispensed from the hopper, and is shown comprising a spring biased movable bar 32 movably supported in a guideway 33, best illustrated in Figure 2. The intermediate portion of bar 32 has one end of a spring 34 attached thereto, the opposite end of which is anchored to one of a pair of brackets 35, shown secured to the channel members by suitable bolts 36. The exposed edge 37 of bar 32 cooperates with the edge 38 of a fixed bar 39 to vary the width of the nail guide slot 31 in accordance with the size of the shanks of the nails to be used for a given job. It is to be understood that the width of the slot 31 is such as to prevent the nail heads from passing therethrough, whereby the nails are suspended by their heads in the elongated guideway or slot 31, as they successively discharge from the hopper. See Figure 5.

For moving the bar 32 to adjust the width of the slot 31 in accordance with the diameter of the shank of the nail to be used, a cam element 41 is pivoted at 42 to the bottom wall 18 of the hopper and has an operating handle 43 whereby it may readily be rotated from one position to another. The cam element 41 has a plurality of cam faces each bearing an identification number, such as 1, 2, 3 and 4, which represents four different nail sizes. The cam faces are spaced progressively farther away from the axis of the pivot pin 42, as is clearly illustrated in Figure 6, whereby one end of the movable bar 32 is adjustable by steps to and from the effective edge 38 of the fixed bar 39. The opposite end of the bar 32 is adjustable in a manner hereinafter to be described.

The hopper 17 as hereinbefore stated, is mounted for pivotal movement between the full and dotted line positions shown in Figure 1, during operation of the machine. Such oscillation of the hopper constantly agitates the nails in the hopper whereby they are not likely to become permanently lodged in the guide slot 31 of the hopper.

Further to prevent the nails from becoming lodged at the discharge end of the guide slot 31, a plate 44 is pivotally mounted on the inner face of the front wall 45 of the hopper, as indicated at 46 in Figure 2. The lower end portion 47 of the plate 44 is adapted for swinging movement towards and away from the front hopper wall 45 during oscillation of the hopper, as will be understood by reference to Figure 1. Plate 44 is mounted for vertical adjustment on the front wall 45 of the hopper to space accurately its bottom edge 48 from the bottom wall 18 of the hopper, thereby to accommodate nails of different sizes.

To adjust the plate 44 vertically upon the front wall of the hopper, the upper end of plate 44 is pivoted to a secondary plate 49 which, in turn, is adjustably secured to the front hopper wall 45 by wing bolts 51, as shown in Figure 3. The secondary plate 49 is provided with vertically spaced slots 52 for receiving the bolts 51, as will be understood by reference to Figure 2. An enlarged opening 53 is provided in hopper wall 45 to permit free passage of the nail heads from the hopper, as best illustrated in Figure 5.

The cross member 15 of the machine frame has a rearwardly extending shelf 54 upon which is mounted two boxlike members 55 and 56, secured thereto by suitable bolts 57, as shown in Figure 1. The members 55 and 56 are provided at their upper ends with upright lugs 58 and 59, respectively, each having a bushing 61 fixedly secured therein. The bushings 61 are bored to receive the spring pressed pivot pins 20 of the hopper 17, thereby to pivotally support the forward end of the hopper in the machine frame.

Operating means for nail hopper

The operating means for the hopper 17 is best illustrated in Figures 4, 5, 12 and 12A. It comprises a cylinder 62 the lower end of which is secured to a suitable base or valve body or housing 63 having a detachable cap 64 secured to its lower end, which is pivoted to the machine frame by a suitable pivot pin or rod 65, shown in Figures 4 and 5.

A piston 66 is mounted for reciprocal movement within the cylinder 62, and has one end of a piston rod 67 secured thereto, as shown in Figure 4. Piston 66 is annularly grooved to receive a suitable sealing element 68 to prevent escape of the pressure fluid around the piston.

The upper end of piston rod 67 is detachably connected to a cross rod 69 having the corresponding ends of a pair of elongated bars 70 secured thereto in spaced relation lengthwise of the rod 69. The bars 70 are fixedly secured to the rod 69 as by welding, and have their forward ends apertured to receive the projecting end portions 71 of the bushings 61 in the upright lugs 58 and 59, as best illustrated in Figure 7.

By thus pivotally supporting the forward ends of bars 70 on the projecting portions of bushings 61, said bars and rod 69 normally move as a unit with the hopper 17, when the latter is oscillated between the full and dotted line positions shown in Figure 1. It is to be noted that the depending brackets 35 of the hopper have their lower ends notched to receive the opposed terminals of the rod 69, whereby the brackets 35 may readily be detached from said rod when the pivot pins 20 are released from the bushings 61, thereby to permit convenient removal of the hopper from the machine. The detachable connection between the upper end of piston rod 67 and rod 69 may readily be effected by simply longitudinally slotting the upper end of the piston rod, as shown in Figure 5, and mounting a cotter pin in the bifurcated terminals thereof.

Another important feature of the invention resides in the unique valve mechanism provided for controlling the flow of pressure fluid to and from the lower end of cylinder 62 to effect operation of piston rod 67. As best illustrated in Figure 4, the valve body 63 at the lower end of cylinder 62 has an enlarged bore 72 therein which terminates at its upper end in a restricted bore 73. Bore 73 extends from bore 72 to the interior of the lower end of the cylinder, as clearly illustrated in Figure 4.

An enlarged piston 74 is mounted in the enlarged bore 72 and has a reduced stem 75 which extends upwardly through the restricted bore 73 and provides, in effect, two relatively smaller axially spaced pistons 76 and 77, separated by a reduced neck portion 78. A small tube or conduit 79 has its upper end in communication with the interior of cylinder 62 above piston 66. The lower end of tube 79 is shown secured to an L-shaped fitting 81, which in turn is secured to the cap 64. A small duct 82 establishes communication between the fitting 81 and the enlarged bore 72 below the piston 74.

An air supply tube or conduit 83 has one end secured in the valve housing 63, and a small duct 84 connects said tube to the restricted bore 73, as best shown in Figure 4. The valve housing 63 has a release duct 85 leading from the restricted bore 73 to the atmosphere. A second port 86 has its upper end in communication with the interior of the bottom of cylinder 62, and has its lower end in communication with a duct 87 which establishes communication between port 86 and the restricted bore 73 in the valve housing, as clearly illustrated in Figure 4. The valve housing also has a relief port 88 for venting the upper end of bore 72 above piston 74, and to prevent the formation of a vacuum in said bore or the development of a back pressure therein, when the piston 74 is actuated.

The opposite end of the air supply tube 83 is connected to a needle valve, generally designated by the numeral 89 (Figure 12) provided in the block-like coupling member 14 of the tubular frame member 3. The needle valve 89 has a valve stem 90 which may be conveniently manipulated by the operator to regulate the supply of air to the valve housing or mechanism 63 of cylinder 62, and to control and regulate the oscillatory movement of the hopper operating rod 67.

Means for guiding nails from hopper to nail picker

A guideway is provided for guiding the nails from the primary guide slot 31 in the bottom of the hopper to the nail picker, subsequently to be described, and is best shown in Figures 1, 2, 5, 6, 8 and 9. It consists of a guide member 91 comprising spaced walls 92 and 93 shown constructed of sheet metal and having their lower edge portions secured together by a tie member 94, as best illustrated in Figures 5 and 10. In other words, the spaced walls 92 and 93 and the tie member 94 of member 91 may be formed of a single blank of sheet metal, as clearly illustrated in Figure 10. The wall 92 of the guide member 91 is shown apertured to receive fastening screws 95 for securing the guide member 91 in position between frame members 55 and 56, as shown in Figure 10.

The walls 92 and 93 of the member 91 are spaced apart to provide a secondary nail guide or slot 96, the upper end of which is in direct communication with the forward end of the primary guide slot 31 in the bottom of hopper 17. The wall 93 of the guide member 91 is adjustable with respect to its complemental wall member 92, thereby to vary the width of guide slot 96 for different sizes of nails. To vary the size of the second slot 96, a cam element 97, similar to cam element 41 on the bottom of the hopper 17, is provided on the box-like member 56 substantially equidistant from the upper and lower ends of the member 91 for laterally shifting wall 93 relative to the fixed wall 92, thereby to vary the width of the secondary guide slot 96. In other words, the cam element 97 has a plurality of flat faces spaced at progressively varying distances from the axis of its pivot pin 98. These flat faces are shown identified by numerals 1-2-3-4, which correspond to the marking of the flat faces provided on the cam element 41.

Figures 8, 9, 10, 11:
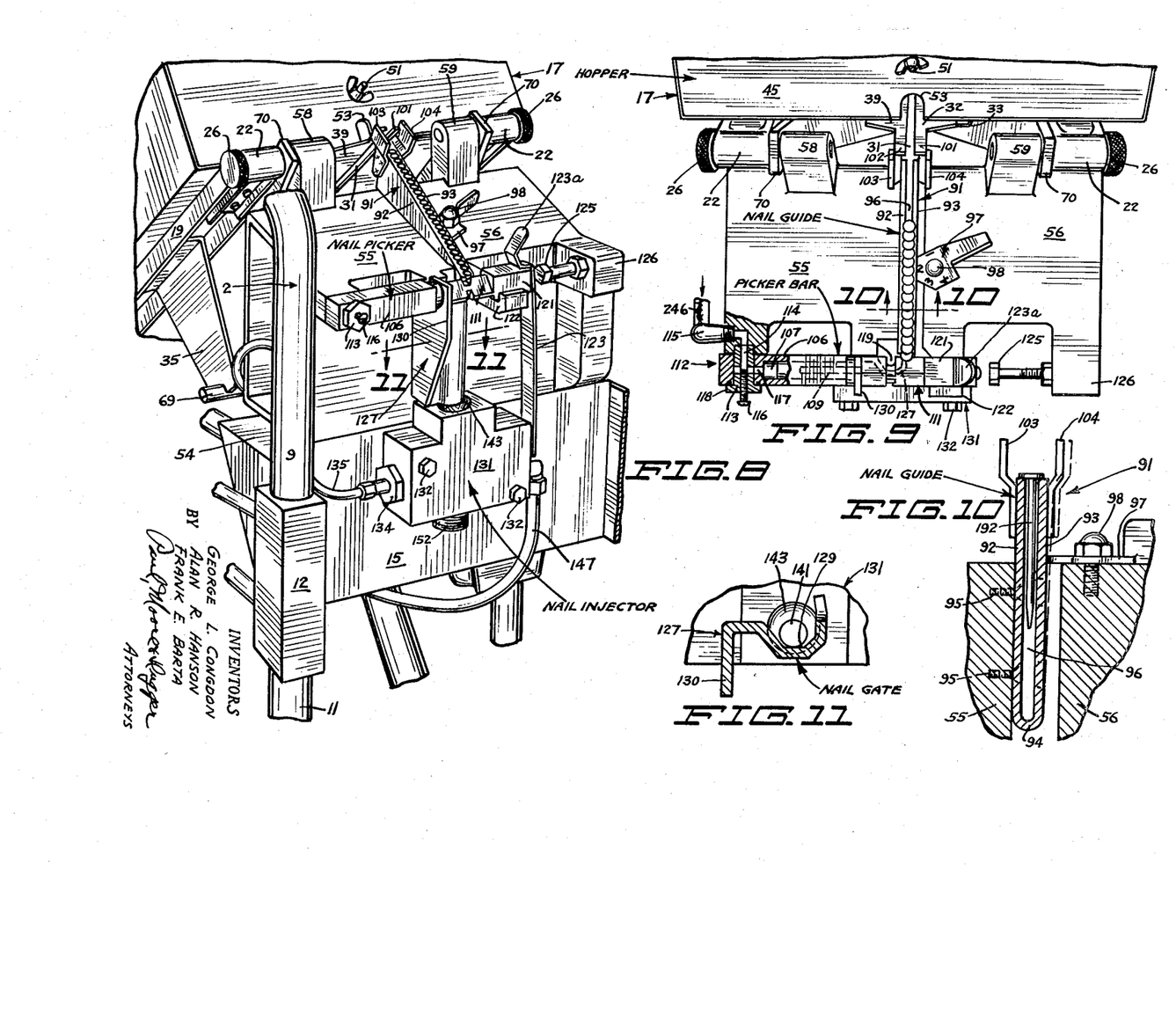
Figure 8 is a perspective view of a portion of the front of the machine, showing the guideway or slot for successively guiding the nails from the nail hopper to the picker bar, and also showing the nail ejection positioned beneath the picker bar for receiving the nails therefrom for delivery into the tube which conducts the nails from the nailing machine to the driving head.
Figure 9 is a top view of Figure 8, showing the pivoted cam element for varying the width of the nail guide.
Figure 10 is an enlarged detail sectional view on the line 10—10 of Figure 9.
Figure 11 is an enlarged detail sectional view on the line 11—11 of Figure 8, showing the construction of the nail gate.

Another feature of the invention resides in the operative connection between the upper ends of the walls 92 and 93 of the secondary nail guide member 96, and the movable and fixed members 32 and 39 forming the primary guide slot 31 in the bottom of the hopper. As shown in Figures 6, 8 and 9, the movable member 32 and fixed member 39 of the hopper are provided with forwardly extending reduced end portions 101 and 102, respectively, which are receivable between a pair of laterally spaced upright lugs 103 and 104 of the opposed walls 92 and 93, respectively, of the secondary guide slot 96. Lugs 103 and 104 may be formed independently of their respective walls 92 and 93, and may be spot welded to said walls, as indicated in Figure 8. The upper ends of the lugs 103 and and 104 are laterally offset to widen the gap therebetween to facilitate receiving the forwardly extending reduced portions 101 and 102 of the nail guide forming members 32 and 39 of the hopper, as will be understood by reference to Figures 8 and 9.

By thus interconnecting the upper end portions of the elements which form the primary and secondary guide guide slots 31 and 96, the guide slots at their point of connection are always of uniform width, it being understood that the forward end of the movable bar or member 32 of the primary guide slot 31 in the bottom of the hopper is constantly urged in an outward direction to widen the guide slot by the action of spring 34. The spring 34, as shown in Figure 6, has one end connected to a stud 105 anchored to the movable bar 32, and is movable in a clearance slot 105a provided in the fixed guide rail 33. Thus, regardless of the position of the hopper between the full and dotted line positions indicated in Figure 1, the primary and secondary guide slots 31 and 96 cooperate to form a continuous travel path for the nails from the hopper to the nail picker, next to be described.

*Nail picker*

The nail picker is best illustrated in Figures 3, 8, 9, 12 and 12A. It comprises a cylinder 106 having a bore 107 therein in which is slidably mounted a plunger 108, bored to receive a cylindrical stem 109 of a picker bar, generally designated by the numeral 111. The cylinder 106 is pivotally mounted on the member 55, as best illustrated at 112 in Figure 9. A stud 113 pivotally supports the picker cylinder 106 and has a fluid duct 114 extending lengthwise therethrough, one end of which is in communication with an air intake 115 having a connection with a source of pressure fluid, as will subsequently be described. The opposite end of duct 114 has an adjusting screw 116 received in threaded engagement therewith, which controls the flow of air to the picker cylinder 106 through an air passage 117, as will readily be understood by reference to Figure 9. The stud 113 has a head 118 for retaining the picker cylinder 106 in position thereon.

One end of the picker bar 111 has a plurality of transversely disposed nail-receiving slots 119 therein of varying sizes, each size being adapted to receive a nail of a given size. The opposite end portion 121 of the picker bar is square in cross section and is normally supported in a projection 122 of the frame member 56, as best illustrated in Figure 8. The projection 122 serves as a rest or guide for the picker bar. The picker bar is longitudinally slidable in the guide 122 when the picker bar is actuated to pick a nail from the secondary nail guide 96 and convey it therefrom to a position for delivery into a nail injector, subsequently to be described.

Figure 12:
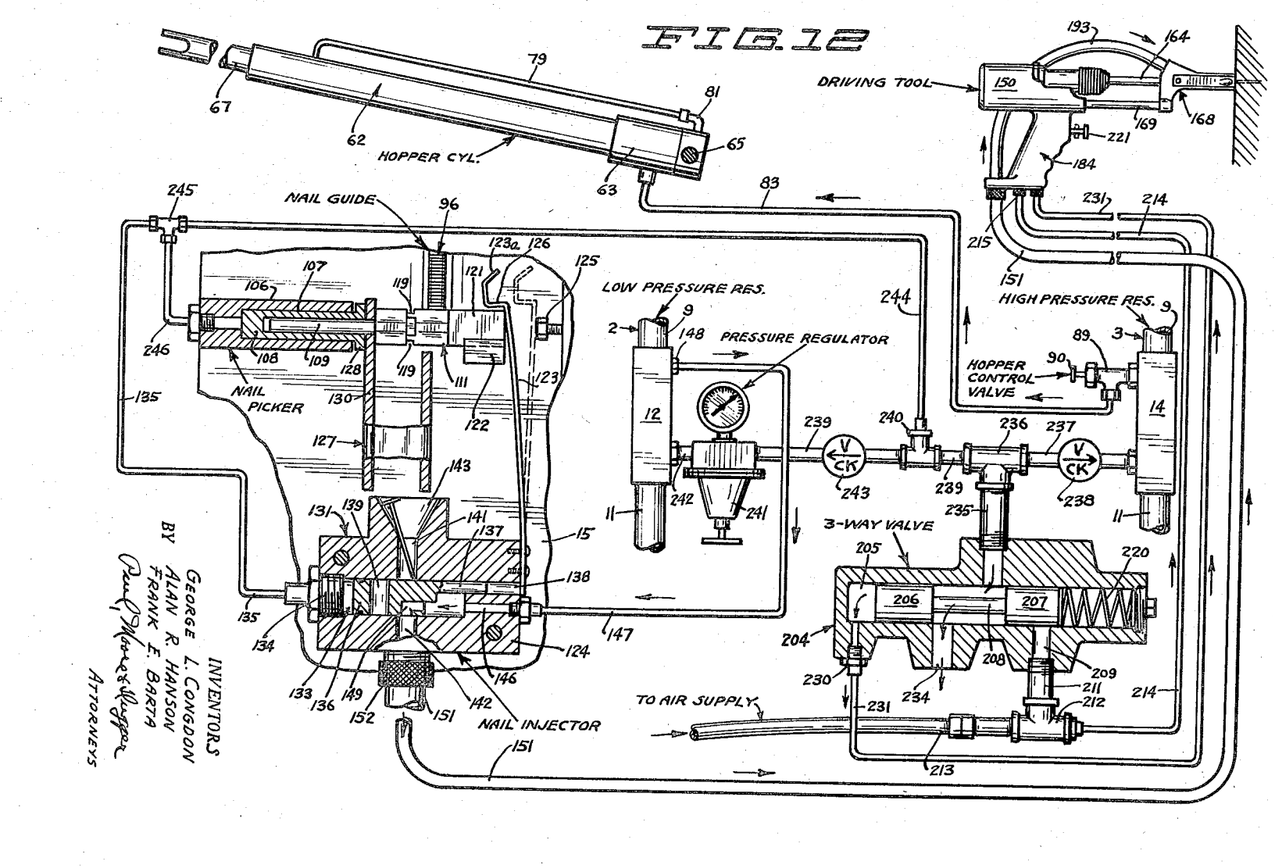
Figure 12 is a schematic view showing the operative connections between the various operating mechanisms of the machine with the parts in their normal positions, as when the trigger in the driving head or tool is in its normal released positions.

When the pneumatic nail-driving tool or head is inoperative, the picker bar is positioned as shown in Figures 8 and 12, by the action of a spring or flexible element 123. The lower end of spring element 123 is shown fixedly secured to a nail injector block or valve 124 secured to the front cross member 15 of the machine frame, as best illustrated in Figure 8. A stop screw 125 is adjustably mounted in a forwardly projecting lug 126 of the box-like frame member 56, as best illustrated in Figure 8, and functions to limit the swinging movement of the upper end of spring element 123, thereby to align the selected nail-receiving slot in the picker bar accurately with the nail guide 96, as will readily be understood.

The picker bar 111, as hereinbefore stated, has a plurality of nail-receiving slots which are arranged ninety degrees apart around the circumference of the picker bar. The picker bar is therefore rotatably adjustable with respect to the nail guide 96, whereby the nail-receiving slots are selectively movable into operative position with respect to the nail guide.

Such rotary adjustment of the picker bar is made possible by the pivotal mounting of the picker bar cylinder 106 on the frame member 55 by pivot 113. The picker bar is normally retained in sliding engagement with its supporting member 122 by the upper offset portion 123a of the spring member 123. When the picker bar is to be relatively adjusted to adapt the machine for a different size nail, the operator manually swings the flexible element 123 outwardly to the dotted line position indicated in Figure 12, after which the adjacent end of the picker bar may be swung clear of its support 122, thereby to permit free rotary adjustment of the picker bar with respect to the nail guide, thereby to bring the selected nail notch in the picker bar into operative relation to the nail guide 96. The picker bar is then returned to its position in its supporting member 122, whereupon the spring will retain it in such position, and at the same time permit it to be axially translated therein, as when successively feeding nails from guide slot 96 into position for delivery to the injector valve 124.

Figure 12A:
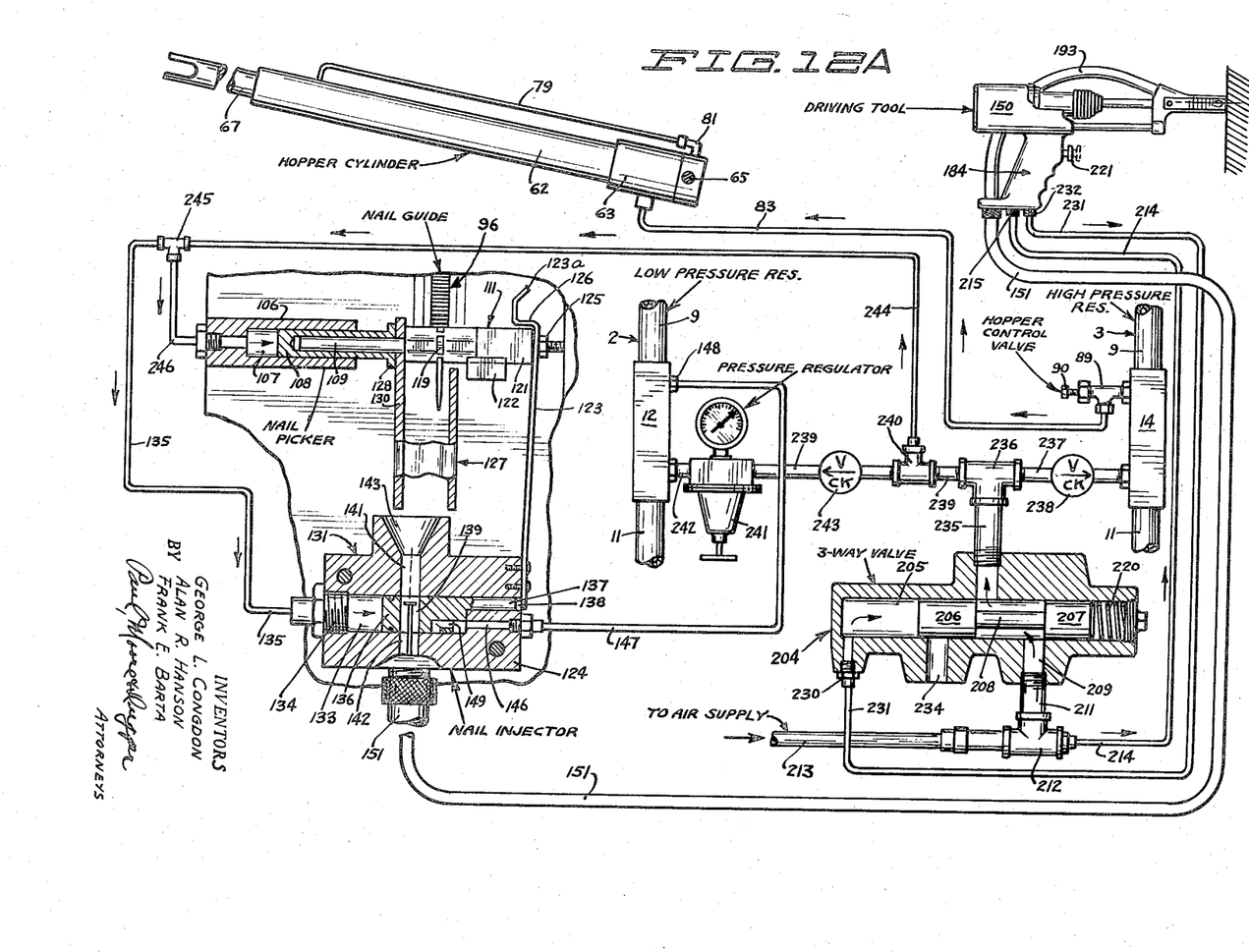
Figure 12A is a view similar to Figure 12, but showing the positions of the various mechanisms when the trigger in the driving head has been depressed to cause the machine to drive a nail into the work.

To transfer the nails successively from the nail guide to the injector valve, a gate, generally designated by the numeral 127, has its upper end pivotally supported on the cylindrical stem 109 of the picker bar between the adjacent end 128 of the picker bar plunger 108 and the adjacent end of the picker bar, as clearly illustrated in Figures 12 and 12A. The nail gate 127 may be formed from sheet metal and is preferably shaped, cross sectionally, as shown in Figures 8 and 11.

The upper end of the wall portion 130 of the nail gate is apertured to receive the cylindrical stem 109 of the picker bar, and its opposite side is formed to provide an inwardly facing nail channel 129. The channel 129 is intermittently brought into registration with nail guide 96 to receive a nail therefrom and laterally feed or transfer it to a position over the nail injector valve 124. The pivotal mounting of nail gate 127 upon the cylindrical extension 109 of the picker bar makes it possible for the operator to swing the nail gate outwardly to free nails which may accidently become clogged therein. This may readily be accomplished without removing any parts of the mechanism.

*Nail injector valve*

The nail injector is best illustrated in Figures 3, 8, 12 and 12A, and functions to deliver the nails into the hose or tube which conducts the nails from the machine to the driving tool. It comprises a body 131 shown fixed to the front cross member 15 of the machine frame by such means as bolts 132. The body 131 has a cylindrical horizontal bore 133 therein which extends into the body 131 a considerable distance, from one end thereof, as best illustrated in Figures 12 and 12A. A plug 134 closes one end of the bore 133 and has one end of a small air tube 135 connected thereto for conducting a pressure fluid to the cylindrical bore 133.

Mounted within the bore 133 is a piston 136 having an eccentrically disposed cylindrical extension 137 fixed to one end thereof, which is slidably received in a guide bore 138 provided in the body member 131 at one end of the bore 133. The cylindrical extension 137 and guide bore 138 cooperate to prevent the piston 136 from relatively rotating in the bore 133.

The piston 136 of the nail injector valve has a nail passage 139 extending transversely therethrough which, during the operation of the driving head, is axially aligned with nail passages 141 and 142 provided in the body member 131, as best illustrated in Figure 12A. The nail passage 141 has its upper end outwardly flared to provide a funnel-like intake 143 for guiding the nail from the nail gate into the passage 141 in the body member 131, as will readily be understood by reference to Figures 12 and 12A.

Means is provided for normally maintaining and automatically returning the nail injector piston 136 to the position shown in Figure 12, the piston 136 closing the nail passage 142 from the passage 141 to prevent the passage of nails therethrough, as will best be understood by reference to Figure 12. Air pressure is utilized for thus returning piston 136 to its normal position, shown in Figure 12, through a small air duct 146 provided in the valve body 131 and having one end in communication with the enlarged cylindrical bore 133 in the injector valve body. The opposite end of duct 146 is in communication with one end of an air supply tube or conduit 147, the opposite end of which is connected to the left hand air reservoir 2, as indicated at 148 in Figure 12A.

The piston 136 also has an air passage 149 extending inwardly from one end thereof to a position to register with the nail passage 142, when the piston 136 is in its normal position shown in Figure 12. When so positioned, air entering the cylindrical bore 133 through air duct 146 is directed into a nail tube 151 which is attached to the body of the injector valve 131 by a fitting 152, whereby the nail tube 151 is in direct communication with the nail passage 142 in the injector valve body 131.

*Nail driving tool or head*

Figures 16, 17, 18, 19, 20:
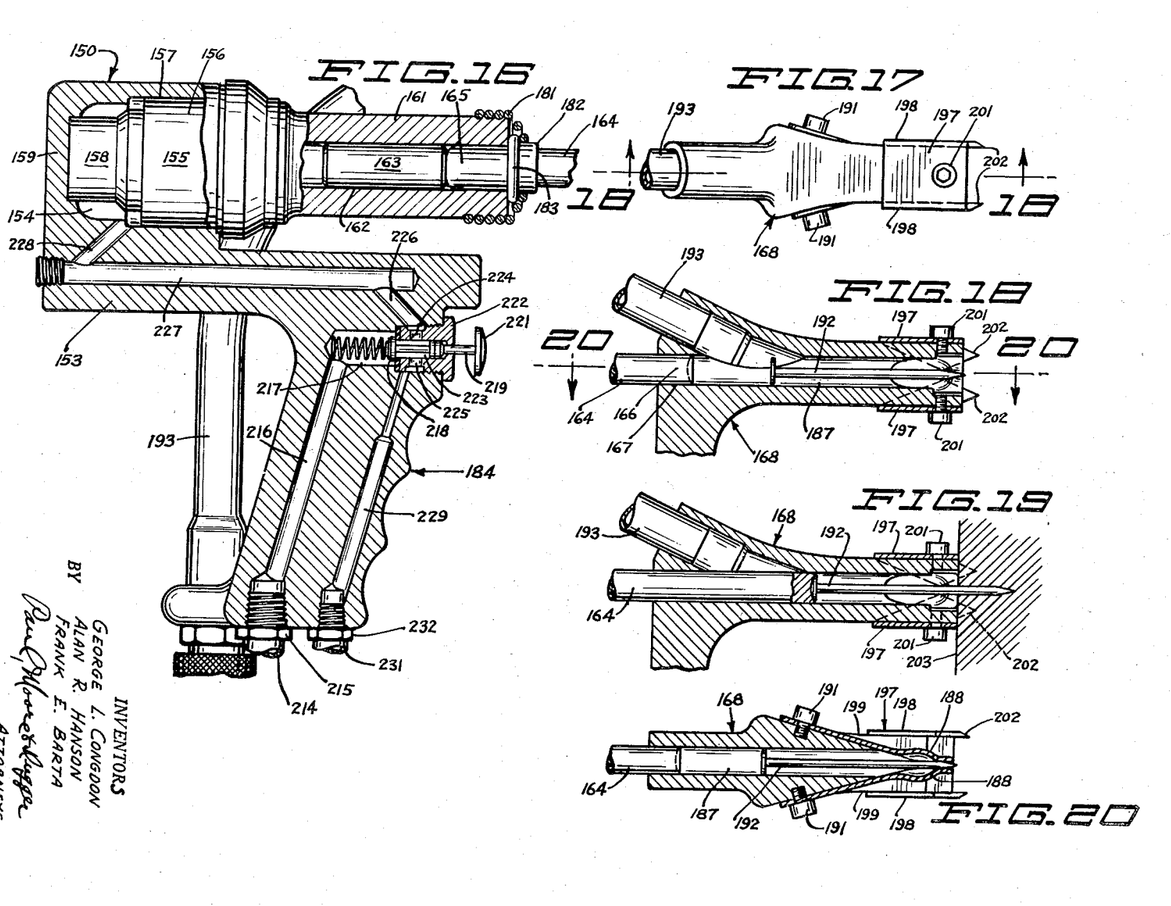
Figure 16 is an enlarged detail sectional view on the line 16—16 of Figure 14, showing the construction of the trigger valve in the driving head for controlling the operation of the machine.
Figure 17 is a top view of the front end or nose of the driving tool.
Figure 18 is a detail sectional view on the line 18—18 of Figure 17, showing a nail in position in the nail chuck.
Figure 19 is a view similar to Figure 18, showing the nail partially driven into the work.
Figure 20 is a detail sectional view on the line 20—20 of Figure 18, showing a nail positioned between the resilient jaws of the nail chuck in position for the next nail-driving operation of the gun.

The nail driving tool or head herein disclosed, designated by the numeral 150 (Figures 13 to 20), constitutes another important feature of the present invention. It comprises a body member 153 having a chamber 154 therein in which is mounted an air operated motor of conventional construction, generally designated by the numeral 155. The enlarged portion 156 of the air motor 155 is snugly fitted into a bore 157 in the body 153, as best illustrated in Figure 16. The motor 155 also has a reduced end portion 158 shown seated against the end wall 159 of the driving tool 150, whereby the air chamber 154 is in the form of an annulus surrounding the reduced end portion 158 of the air motor.

Figures 13, 14, 15:
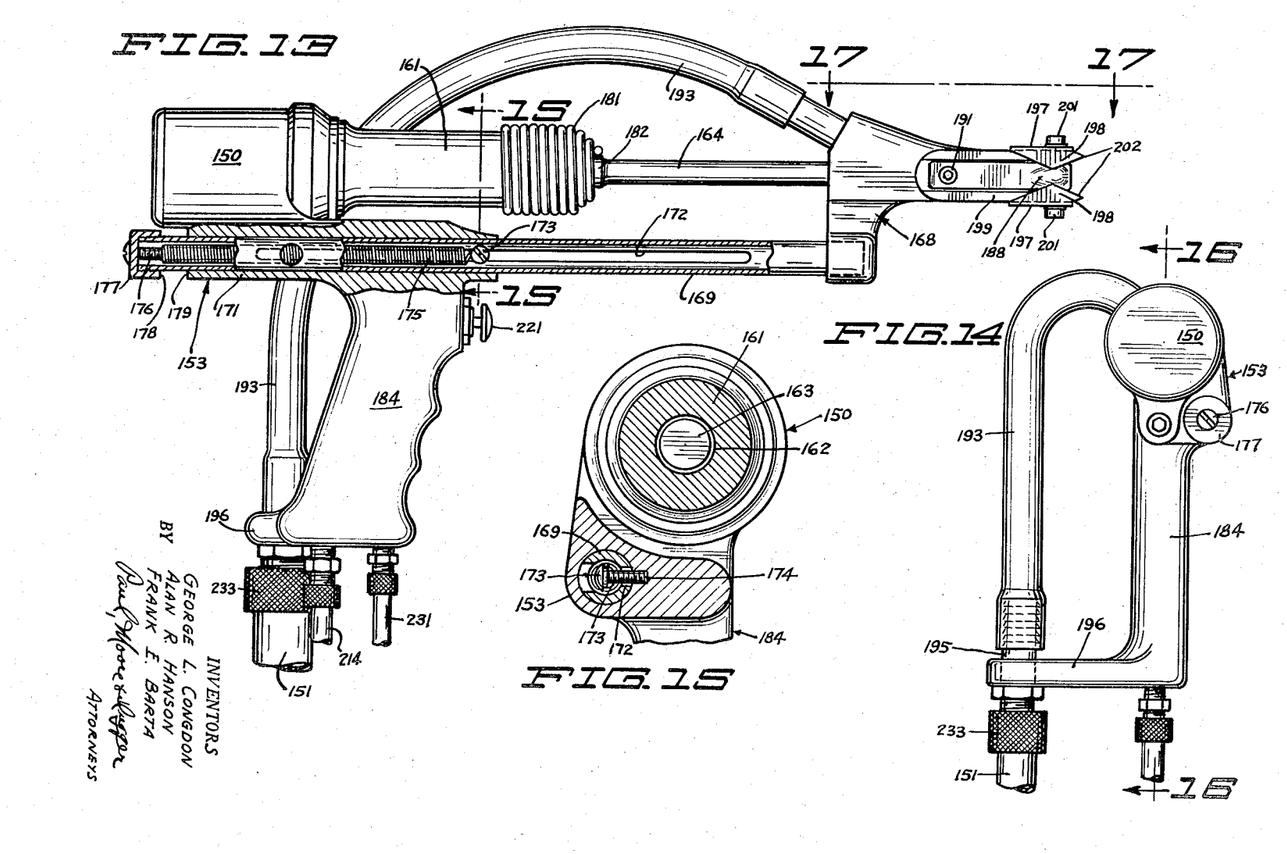
Figure 13 is an enlarged elevational view of the driving head, partially broken away.
Figure 14 is a rear view of the driving head.
Figure 15 is an enlarged detail sectional view on the line 15—15 of Figure 13.

The air motor 155 of the driving tool 150 has a forwardly extending cylindrical portion 161 having a bore 162 therein in which is slidably mounted the usual hammer or striker element 163 of the driving tool. A hammer rod 164 has an end portion 165 slidably mounted in the bore 162 and positioned to be engaged by the hammer or striker element 163, when the motor 155 is operated. The opposite end portion 166 of the hammer rod 164 is slidably supported in a bore 167 provided in a nail chuck 168. The nail chuck is operatively connected to the body member 153 of the driving tool 150 by a tubular member 169, as best illustrated in Figure 13. The tubular member 169 has its forward end fixed to the nail chuck 168 and has its opposite end slidably mounted in a tubular guide 171, provided in the body member 153 of the driving tool. Tubular member 169 has a slot 172 in the wall thereof traversed by a small screw 173 which is anchored in body member 153 of the air gun, as shown at 174 in Figure 15.

One end of a suitable spring 175 is anchored to the screw 173 and has its opposite end fixed to a screw 176, mounted in a cap 177 attached to the projecting end of tube 169 by suitable screw threads, as will be understood by reference to Figure 13. The forward end 178 of the cap 177 is normally spaced from the adjacent end 179 of the tubular guide 171, to permit limited reciprocal movement of the tubular member 169, when the driving tool is operated to drive a nail.

Another feature of the invention resides in the novel means provided for detachably supporting the hammer rod 164 in the driving head, whereby should said rod accidently become damaged when the apparatus is in use, the damaged rod may readily and quickly be detached from the gun and a new one substituted therefor. To thus detachably support the hammer rod 164 in the gun, a spiral spring, generally designated by the numeral 181, has its rear end portion received in threaded engagement with the periphery of the cylindrical portion 161 of the air motor 155, as best illustrated in Figure 16.

The opposite or forward end of spring 181 is reduced in diameter and snugly fits an enlargement 182 of the hammer rod 164 and is seated against an enlarged flange 183 provided on the hammer rod 164 rearwardly of the enlargement 182. Thus, spring 181 normally retains the hammer rod 164 in its rearward position with its flange 183 abuttingly engaging the adjacent end of the cylindrical portion 161 of the air motor 155.

To detach the hammer rod 164 from the gun, the operator simply removes cap 177 from the end of the tubular member 169, whereby the tubular member 169 may be pulled forwardly until the rear end of slot 172 therein engages the stop screw 173. Such relative forward movement of the tubular member 169 will cause the nail chuck 168 to move outwardly out of engagement with the forward end 166 of the hammer rod 164, whereby the latter may readily be detached therefrom by simply unscrewing the spiral spring 181 from the cylindrical portion 161 of the driving head, as will readily be understood by reference to Figure 16. The body 153 of the driving head has a suitable pistol grip 184 provided with suitable air ducts, as will subsequently be described.

The nail chuck 168 has a longitudinal nail receiving chamber 187 which extends inwardly from the forward end or nose of the nail chuck and has its rear end in direct communication with the guide bore 167 for the forward end of the hammer rod 164, as clearly illustrated in Figures 18, 19 and 20. A pair of resilient co-acting jaws 188 are detachably secured to the forward end of the nail chuck by such means as screws 191. The forward resilient ends of said jaws are disposed in the path of the shank of each nail 192 delivered into chamber 187, as best illustrated in Figure 20.

The co-acting jaws 188 are so shaped at their forward ends as to grip the sharpened end portion of each nail and retain it in position in said bore 187. A flexible nail delivery tube 193 has one end in communication with nail chamber 187 and its opposite end connected to a nipple 195, anchored in a lateral extension 196 of the pistol grip 184, as best illustrated in Figure 14. The forward end of hammer rod 164 is concave to receive the nail head and retain the nail in axial alignment with bore 187 on the nail chuck.

Another important feature of the invention resides in the means provided at the forward end of the nail chuck 168 to support the nose of the driving tool or head on the work in which the nail is to be driven. Such means resides in the provision of a pair of opposed plate elements 197 having flanges 198 fitting against the opposite side faces 199 of the nail chuck 168, as best illustrated in Figure 13. The forward end of the nail chuck is preferably square in cross section, as indicated in Figure 13. Screws 201 detachably secure the plate elements 197 to the chuck, as will readily be understood by reference to Figures 13, 17, 18 and 19.

Each plate element is provided at its forward end with forwardly extending spurs 202 which may be thrust into the surface of the wall or board 203 into which the nail is to be driven, as clearly indicated in Figure 19. Side flanges 198 of the plate elements 197 are preferably shaped as shown in Figure 13, whereby they overlay the resilient jaws 188 of the nail chuck, thereby to limit the outward flexing of said jaws. In the drawings, each plate element 197 is shown provided with two spurs. It is to be understood, however, that if desired the number of spurs may be varied as, for example, in some instances it may be more desirable to provide each plate element with but a single spur. The spurs are essential in that there is obviously more or less vibration in the chuck, when a nail is being driven into the work, and the spurs prevent the nose of the chuck from tending to shift its position on the work during the nailing operation.

*Fluid circulating system*

The fluid circulating system is best illustrated in Figures 12 and 12A, and includes the tubular side frame members 2 and 3, which constitute fluid pressure reservoirs or tanks, as hereinbefore stated, and a 3-way valve, generally designated by the numeral 204. The valve 204 has a longitudinal bore 205 therein having axially spaced interconnected pistons 206 and 207 mounted for reciprocal movement therein under the influence of fluid pressure in one direction, and spring pressure in the opposite direction, as will subsequently be described. Pistons 206 and 207 are secured together for simultaneous operation by a connection 208.

This valve 204 has an intake 209 shown connected to a pipe fitting 211 having a conventional T 212 secured to its lower end. An air supply pipe 213 is connected to one end of the T fitting 212 and has its opposite end connected to a suitable source of air supply, under pressure, not shown in the drawings. A small flexible conduit 214 has one end connected to the opposite end of T 212 and leads therefrom to a fitting 215 secured in the bottom end of the pistol grip 184 of the driving tool 150. The fitting 215 is in direct communication with an air channel 216, see Figure 16, provided in the pistol grip 184. The upper end of air channel 216 is in communication with a small valve chamber 217 having a valve 218 therein connected to a valve stem 219. A finger button 221 is secured to the projecting end of valve stem 219, whereby valve 218 may readily be manipulated to effect operation of the driving head.

The valve 218 (Figure 16), and stem 219 are shown supported in a suitable fitting or plug 222 received in a threaded socket provided in the upper end portion of the pistol grip 184. Fitting 222, in effect, serves as a valve housing and has a small axial bore 223 therein which is in direct communication with transversely disposed air ducts 224 and 225 in the body of the fitting or valve housing 222, as best illustrated in Figure 16. The fitting 222 is so positioned in the pistol grip 184 that its upper transverse air duct 224 is constantly in communication with a small air passage 226 which is in direct communication with one end of an elongated air passage 227, the opposite end of which is in communication with the annular air chamber 154 in the body 153 of the driving tool, by a connecting passage 228.

Also connected to the bore 223 in the valve fitting 222 is one end of an air passage 229, the lower end of which is in communication with one end of a small flexible conduit 231 by means of a suitable fitting 232. The opposite end of tube 231 is in constant communication with one end of the bore 205 of the 3-way valve 204, as indicated at 230 in Figures 12 and 12A. Nail tube 151 is connected to the short flexible conduit 193 of the driving head, as indicated at 233 in Figures 13, 14 and 16. Nail tubes 151 and 193 are constructed of a transparent plastic material, whereby should a nail accidentally become lodged therein, the operator may readily note where the obstruction is located so that he may quickly clear the tube of such obstruction.

The 3-way valve has a discharge port 234 through which the compressed air within the fluid circulating system may be quickly exhausted to the atmosphere at the completion of each operating cycle, as may be noted by reference to Figure 12. The bore 205 of the 3-way valve is shown in communication with one end of a pipe nipple 235, having a conventional T fitting 236 secured thereto. One branch of the T 236 has a conduit 237 connecting it to the tubular frame member and air reservoir 3 at the right hand side of the machine, when viewed as shown in Figure 3. A conventional check valve 238 is provided in the connection 237 which permits free flow of the pressure fluid into air reservoir 3, but prevents return flow of the air therefrom through conduit 237.

A similar conduit or connection 239 connects the opposite branch of the T 236 to one side of a conventional pressure regulator, generally designated by the numeral 241. The low pressure side of the pressure regulator is connected to the left side air reservoir 2 by a suitable nipple 242. Imposed in the conduit 239 is a check valve 243, similar to check valve 238, which permits free flow of the pressure fluid to the pressure regulator, as will be understood. A small conduit 244 has one end in communication with conduit 239, ahead of check valve 243, through a fitting 240. The opposite end of conduit 244 is connected to a T fitting 245, and a small tube 246 establishes communication between T fitting 245 and one end of the cylindrical bore 107 of the picker bar cylinder 106, as shown in Figures 12 and 12A. The other branch of T fitting 245 is connected by tube 135 to the cylindrical bore 133 of the valve 131, as hereinbefore stated.

From the foregoing it will be noted that when the driving tool or head 150 is being operated, tubes 244, 246 and 135 are under full line pressure, as will be understood by reference to Figure 12A. When tubes 244, 246 and 135 are thus pressurized, the picker bar plunger is thrust forwardly to move the nail gate 127 into position to receive a nail from the nail guide 96, and at the same time the injector valve piston 136 is shifted to the position shown in Figure 12A. When so positioned, the nail supported in the funnel-shaped opening 143 in the upper portion of the injector valve drops by gravity into the nail tube 151, and is subsequently forced through tube 151 by air pressure, into the nail chuck 168 in position for the next nail driving cycle, shown in Figure 18.

In Figure 12A, a nail is shown positioned in the transverse nail passage 139 provided in the piston 136. It is to be understood that the nail does not come to rest in this position, as it quickly drops or passes through the transverse bore 139 in piston 136 into the nail tube 151, when released from the bore 141 in the upper portion of the injector valve housing.

Operation

To prepare the nailing machine for operation, a quantity of nails are dumped into the nail hopper 17. The hopper may then be manually oscillated about the axis of pivot pins 20 to cause some of the nails to drop into the nail guide slot 31 in the bottom of the hopper in which they slide downwardly into nail guide 96 to the nail gate 127, as illustrated in Figure 5.

When the machine is not in use, piston 207 of the 3-way valve 204 under the influence of the spring 220 closes the air intake passageway 209, as shown in Figure 12, and thereby cuts off the air supply to the fluid circulating system. At the same time piston 206 is in its open position uncovering the discharge port 234 to permit the air pressure in the circulating system to discharge to the atmosphere. Under such conditions the nail picker plunger 108 is in its nail-dumping position by the action of spring element 123, and the piston 136 of the injector valve may be in its closed position, as also indicated in Figure 12, as a result of air pressure in tube 147 having displaced the piston to the left at the end of the last operating cycle as will be described in detail hereinafter.

The control valve 218 of the driving tool or gun may then be momentarily opened by manipulation of finger button or trigger valve 221 (Figure 16), which pressurizes chamber 154 of the gun. Simultaneously, air under full line pressure is admitted to the air duct 225, the passageway 229 and thence into bore 205 of the 3-way valve from conduit 231, thereby shifting the interconnected pistons 206 and 207 from their normal positions, shown in Figure 12, to their operative positions against the pressure of the spring 220 as shown in Figure 12A.

When the pistons 206 and 207 are so positioned, the 3-way valve 204 is open to the source of air supply and its discharge port 234 is closed. This allows the air to flow freely through nipple 235 to the T fitting 236, from whence the air full line pressure flows through branch pipe 237 and check valve 238 into the air reservoir 3 (right tubular frame member). This pressurizes the hopper oscillating cylinder 62 because of its connection with air reservoir 3 through conduit 83 and needle valve 89. Air under pressure also enters air reservoir 2 (left tubular frame member) through branch pipe 239 and pressure regulator 241.

Simultaneously air under full line pressure is delivered to the bore 107 of the nail picker 106 through the conduits 244 and 246. This forces plunger 108 from its normal position, shown in Figure 12, against the action of the spring 123, to the position shown in Figure 12A, wherein the nail gate 127 is moved into position to receive a nail from the nail guide 96.

At the same time, air is delivered into the bore 133 of the nail injector valve 131, which forces its piston 136 into nail dropping position, shown in Figure 12A, wherein the nail passageway 139 is aligned with passageways 141 and 142 in the body of the injector valve, any nail in the funnel dropping into the tube 151. The plunger 136 is returned to its normal "closed" position, shown in Figure 12, by reduced air pressure delivered into the opposite end of the injector valve bore from conduit 147, when the air is subsequently released from the line 135, following a nailing operation. Conduit 147, it will be noted, is connected to the low pressure side of pressure regulator 241.

When the air circulating system has been pressurized as above described, one nail is placed manually in the jaws of the gun and one in the funnel. If desired, the gun may be fired twice to locate these nails automatically in the manner now to be described and the nailing machine is ready for use. Each time the trigger 221 of the driving head or gun is depressed, as indicated in Figure 12A, the air motor of the driving head is energized to drive the nail supported in the nail chuck into the work, as indicated in Figure 19. The motor 155 of the driving head operates as a conventional air motor and imparts a series of blows to the hammer 163 in rapid succession which, in turn, transmits the impacts of such blows to the hammer rod 164, the forward end of which engages the nail head, as illustrated in Figure 19. The forward end of the hammer rod 164 is preferably concave, as best illustrated in Figure 19, to prevent the nail head from laterally shifting its position with respect to the axis of the hammer rod 164, during the nail driving operation.

The operations of the nail picker bar 111 and the nail injector valve 131 are automatically controlled by the 3-way valve 204, the operation of which is automatically controlled by manipulation of the trigger 221 of the driving head valve 218.

When the operator releases trigger 221, the pressure in conduit 231 is released to the atmosphere through the passageways 229, 225, 224, 223, 226, 227, 228, the motor 155 and the interior of the tool 150, as shown in Figure 16, which allows the spring 220 to return the pistons 206 and 207 to their normal positions, shown in Figure 12. This opens the exhaust port 234 and thus releases the air in the conduits 244, 246 and 135, thereby allowing the plunger 108 to return to its normal position, shown in Figure 12, under the influence of the spring element 123. At the same time the plunger 136 of the injector valve is returned to its "closed" position by the air pressure exerted thereagainst from conduit 147.

When the nail picker plunger 108 returns to its normal position, the nail gate attached thereto conveys a nail from the nail guide 96 to a position over the injector valve 131, and the nail is then dropped into funnel 143 and passage 141 of the injector valve, as shown in Figure 12, replacing the nail which dropped into the conduit 151 when the plunger 136 was in "open" position as shown in Figure 12A. The nail, however, cannot enter the nail tube 151 because of the plunger 136 closing the passage between the nail passages 141 and 142 of the injector valve.

When the plunger 136 of the injector valve is positioned as shown in Figure 12, the air passage 149 therein is moved into registration with the lower nail passage 142, whereby air from the air reservoir 2 is delivered into the nail tube or hose 151 from conduit 147, which forces the nail which dropped from the funnel 143 through tube 151 and conduit 193 of the driving head, into the nail chuck 168 in position to be driven into the work, when the trigger 221 is again depressed by the operator. See Figure 18.

During the nailing operation, the air pressure contained in reservoir 3 continues to operate the hopper plunger 67 between the full and dotted line positions shown in Figure 1, by the action of the valve mechanism provided in the base of cylinder 62. In said valve mechanism, shown in Figure 4, the piston 74 normally rests on the upper surface of the cap 64, the neck portion 78 between the pistons 76 and 77 permitting a free air passage from the line 83 through the duct 84, the duct 87, the port 86 and into the cylinder 62 below the piston 66. Air thus entering the cylinder 62 from the reservoir 3 causes the piston 66 to be raised within the cylinder moving the plunger 67 and hopper 17 upwardly therewith. The air surrounding the plunger 67 above the piston 66 is thereby compressed, a portion of it passing through the conduit 79, the fitting 81 and the duct 82 into the bore 72 below the piston 74. When sufficient air has entered the bore 72 to force the piston 74 upwardly to the position shown in Figure 4, the piston 76 closes off the duct 84 and the neck portion 78, places the duct 87 in communication with the duct 85 whereupon the air within the cylinder 62 below the piston 66 is free to escape to atmosphere. The piston 66 and the plunger 67 then descend, enlarging the space above the piston 66 thereby reducing the air pressure above the piston, and in the tube 79 and the chamber 72 whereupon the piston 74 returns to its lower position under the force of gravity and any remaining pressure below the piston 66 acting on the upper surface of the piston 77. Air is then readmitted to the cylinder 62 repeating the cycle. Since the plunger 67 is attached to the hopper 17, the hopper is oscillated between the full and dotted line positions shown in Figure 1. Such oscillatory movement of the hopper will continue during the nailing operation and as long thereafter as there is sufficient pressure in reservoir 3 to reciprocate piston 66. When the air pressure in reservoir 3 is finally exhausted, the hopper comes to rest.

At the beginning of every subsequent cycle of the nail machine one nail which, may be called nail A, is in the jaws of the gun. A second nail, called nail B, is in the funnel 143 and a third nail, called C, is at the lowermost end of the nail guide or slot 96. When the trigger is again actuated by the operator, nail A is driven from the jaws of the gun into the work, the three-way valve 204 is actuated and admits air under pressure into the reservoirs 2 and 3 and to the picker bar and injector valve cylinders. When the piston 136 is moved from the Figure 12 to the Figure 12A position, nail B drops from the funnel 143 into the hose 151 coming to rest therein at a bend. Nail C is at this time engaged by the slot 119 of the picker bar 111. When the trigger is released the injector valve piston 136 and the picker bar piston 108 return to their original positions shown in Figure 12 whereupon air enters the hose 151 from the line 147 propelling nail B to the jaws of the gun and nail C drops from the slot 119 into the funnel 143 assuming the position previously occupied by nail B.

The novel nailing machine herein disclosed has proven extremely practical and efficient in actual use. The driving tool or head may be operated at any desired angle. It is sufficiently light in weight so that an operator may readily handle it for a considerable length of time without becoming fatigued. All of the various mechanisms of the machine are readily accessible for convenient inspection or adjustment, when necessary, without special tools. The rear upright portions of the side frame members or reservoirs 2 and 3 provide convenient supports for the flexible hose or tubes or conduits 151, 231 and 214, connecting the driving head to the nailing machine proper. The nail tubes 151 and 193 are constructed of transparent plastic material, whereby the operator may at all times note the passage of the nails therethrough. This is of particular value should the hose 151 become clogged with nails, as such obstruction may be quickly noted through the transparent walls of the tube. The simple construction of the driving head is also of importance in that various parts thereof including the nail chuck, are readily accessible, as hereinbefore stated.

In the accompanying drawings, the nail picker assembly, the nail injector valve and the 3-way valve, are shown as independently constructed units secured in position in the machine frame by such means as bolts. It is to be understood, however, that if desired, these devices may be cast integral with the front cross member 15 and the parts associated therewith.

The foregoing detailed description has been given for clearness of understanding only, and no unnecessary limitations should be understood therefrom, and the appended claims should be construed as broadly as permissible in view of the prior art.

We claim as our invention:

1. In a fastener inserting machine, a frame, a hopper mounted on said frame, a fastener guideway in communication with the hopper, fluid operated fastener feeding means in communication with said guideway, a remotely located driving tool, a flexible conduit forming a fastener passage from the feeding means to the driving tool, a three-way valve connected to a source of fluid under pressure, fluid conduits operatively connecting said three-way valve to the driving tool and the nail feeding means, and a manually operated element on the driving tool for initiating operation of both said tool and said three-way valve, said three-way valve being operable to direct pressurized fluid to the nail feeding means when the manually operated element on the driving tool is operated to actuate said driving tool and when said element is released by an operator said three-way valve will automatically release the pressure fluid from the nail feeding means and thereby condition the machine for the next nailing cycle.

2. In a fastener inserting machine, a frame, a compressed air reservoir on said frame, a fastener hopper mounted for oscillatory movement on said frame, a fastener guideway in communication with the hopper for receiving fasteners therefrom, a driving tool, a flexible fastener delivery tube, fastener feeding means for successively transferring fasteners from the fastener guideway to the driving tool through said flexible tube, a three-way valve for controlling the delivery of compressed air to both the fastener feeding means and to said compressed air reservoir, a manually operable control element on the driving tool for initiating operation of both said tool and said three-way valve, and an air motor for imparting oscillatory movement to said hopper to agitate the fasteners therein during each cycle of operation, said air motor comprising, a cylinder having a piston mounted therein and connected to said hopper, said cylinder having an automatically operated valve mechanism in communication with said air reservoir, the operation of said valve mechanism being automatically controlled by reciprocable movement of the hopper operated piston.

3. In a fastener inserting machine, a frame, a compressed air reservoir on said frame, a fastener hopper mounted for oscillatory movement on said frame, a fastener guideway in communication with the hopper for receiving fasteners therefrom, a driving tool, a flexible fastener delivery tube, fastener feeding means for successively transferring fasteners from the fastener guideway to the driving tool through said flexible tube, a three-way valve for controlling the delivery of compressed air to both the fastener feeding means and to said compressed air reservoir, a manually operable control element on the driving tool for initiating operation of both said tool and said three-way valve, and an air motor for imparting oscillatory movement to said hopper to agitate the fasteners therein during each cycle of operation, said air motor comprising a cylinder having a piston slidable therein and connected to said hopper, said cylinder having an automatically operable valve mechanism in communication with said air reservoir, said valve mechanism comprising a housing fixed to the lower end of the cylinder, a connection placing said housing in communication with said air reservoir and means for regulating the flow of compressed air from said reservoir to said valve mechanism thereby to vary the oscillatory movement of the hopper.

4. In a nailing machine, a supporting frame including opposed tubular frame members, one of which serves as a compressed air reservoir, a nail hopper mounted for pivotal movement on said frame, a nail guide in communication with the hopper, a driving tool, a flexible nail tube, nail feeding means for successively transferring nails from the nail guide to the flexible nail tube, a three-way valve for controlling the delivery of compressed air to the nail feeding means, the driving tool, and said compressed air reservoir, a pneumatically operated device for automatically imparting pivotal movement to said hopper during each cycle of operation, said device having a flexible conduit connecting it to said reservoir, and a single control element on the driving tool for initiating operation of said three-way valve.

5. In a pneumatic nailing machine, a mobile supporting frame comprising tubular side frame members provided with independent compressed air chambers, a hopper a nail guide in communication with the hopper, nail feeding means, a driving tool, a flexible tube for conveying nails from the nail feeding means to the driving tool, a three-way valve having an inlet connected to a source of compressed air, said valve also having an outlet, branch conduits connecting said outlet to said compressed air reservoirs, pressure reducing means in one of said branch conduits whereby one of said reservoirs receives a reduced pressure and the other full line pressure, a conduit connecting the nail feeding means to the outlet of said three-way valve for supplying full line pressure thereto, a second conduit connecting the nail feeding means with the low pressure reservoir for supplying low pressure air to the nail tube, said driving tool having a flexible conduit permanently connecting it to the intake side of said three-way valve and having a second conduit for establishing air circulation between one end of the three-way valve and the driving tool, and a manually operable element mounted on the driving tool for initiating operation of the three-way valve, whereby compressed air is momentarily supplied to said high and low pressure reservoirs, and also to the nail feeding means and the driving tool, whereby the nail feeding means will function to force a nail through the nail tube to reload the driving tool during the nail driving operation.

6. In a nail driving machine of the class described, a mobile frame having a nail hopper mounted for swinging movement therein, nail feeding means, a nail guide for conveying nails from the hopper to the nail feeding means by gravity, a driving tool, a flexible nail tube for conducting nails from the nail feeding means to the driving tool, a three-way valve having a connection with a source of compressed air, said three-way valve also having a fluid circulating connection with the nail feeding means and the driving tool, and a manually operable control element on the driving tool for initiating operation of the three-way valve, thereby to cause the nail feeding means and driving tool to operate, release of the control element causing the nail feeding means to deliver a nail to the driving tool in position for the next cycle.

7. In a portable nailing machine of the class described, means for supporting a quantity of nails in bulk form, nail feeding means, a driving tool, a flexible tube connecting the nail feeding means with the driving tool, a three-way valve connected with a source of compressed air, said driving tool comprising a body having a fluid operated motor therein, a nail chuck carried by said body and mounted for movement relative thereto, said body having a hammer element mounted for reciprocal movement therein by said motor, thereby to drive a nail, said body comprising a pistol grip having flexible conduits connecting it to said three-way valve, and a control valve in said pistol grip having a spring biased trigger positioned to be actuated by an operator's finger, actuation of said trigger causing the three-way valve to supply air under pressure to the nail feeding means and said driving tool, whereby the nail supported in the nail chuck is driven into the work by a series of rapid blows.

8. In a fastener handling machine, a tubular skeleton frame of pipe serving as a compressed air reservoir, a hopper movably mounted on said skeleton pipe frame, a fastener guideway in communication with said hopper for receiving fasteners therefrom as the hopper is moved, air operated means for imparting movement to said hopper, and means connecting said skeleton pipe frame air reservoir to said air operated means for supplying operating air thereto.

9. In a fastener handling machine, a tubular skeleton frame constructed of pipe and serving as a compressed air reservoir, a guideway for supporting a plurality of fasteners, means for releasing one fastener at a time from said guideway, air operated means for controlling the movement of fasteners released from said guideway, and means connecting said skeleton pipe frame air reservoir to said air operated means for supplying operating air thereto.

10. In a fastener handling machine, a supporting frame constructed of pipe and forming a plurality of tubular side frame members, said tubular frame members serving as compressed air reservoirs, a hopper movably mounted on said pipe frame, first air operated means for imparting movement to said hopper, a fastener guideway in communication with said hopper for receiving fasteners therefrom as the hopper is moved, means for releasing one fastener at a time from said guideway, second air operated means for controlling the movement of fasteners released from said guideway, and means connecting said pipe frame air reservoirs to said first and second air operated means for supplying operating air thereto.

11. In a machine for handling headed articles such as fasteners and the like, means for orienting fasteners with respect to their ends comprising a hopper for holding a supply of randomly oriented fasteners, a slot in said hopper for suspending fasteners by their heads, means for agitating said hopper to cause fasteners to enter said slot, and means having a plurality of predetermined positions of adjustment to vary the width of the slot in predetermined increments thereby to accommodate a range of fastener sizes.

12. In a machine for handling headed articles such as fasteners and the like, means for orienting fasteners with respect to their ends comprising a hopper for holding a supply of randomly oriented fasteners, an elongated fastener receiver in said hopper for suspending fasteners by their heads, means for agitating said hopper to cause the fasteners to enter said receiver, said receiver comprising a fixed wall member and a movable wall member, means at all times urging said movable wall member away from the fixed wall member, and a cam to displace said movable member toward said fixed member to vary the space between said wall members thereby to accommodate fasteners of different sizes.

13. In a machine for handling headed articles such as fasteners and the like, means for orienting fasteners with respect to their ends comprising a hopper for holding a supply of randomly oriented fasteners, an elongated fastener receiver in said hopper for suspending fasteners by their heads, means for agitating said hopper to cause the fasteners to enter said receiver, said receiver comprising a fixed wall member and a movable wall member, means at all times urging said movable wall member way from the fixed wall member, and a cam to displace said movable member toward said fixed member, said cam member having a plurality of predetermined positions of adjustment to vary the space between said wall members in fixed increments thereby to accommodate a range of fastener sizes.

14. In a machine for handling headed articles such as fasteners and the like, fastener supporting means comprising a pair of spaced members, said members having fastener engaging surfaces for cooperatively supporting the head of a fastener with its shank extending between the members and said members being joined for relative swinging movement to permit the space between them to be varied.

15. In a machine for handling headed articles such as fasteners and the like, fastener supporting means comprising a pair of substantially parallel spaced plates, the upper portion of said plates being provided with fastener engaging surfaces for cooperatively supporting the head of a fastener with its shank extending between the plates and the lower portion of said plates being joined for relative swinging movement to permit the space between them to be varied.

16. In a machine for handling headed articles such as fasteners and the like, fastener supporting means comprising a pair of substantially vertical spaced plates, the upper portions of said plates being provided with fastener engaging surfaces for cooperatively supporting the head of a fastener with its shank extending between the plates, one of said plates being fixed to the machine and the other being joined to said fixed plate remotely from said fastener engaging surfaces for swinging movement relatively to said fixed plate, and means for moving said other plate toward and away from the fixed plate thereby to accommodate fasteners of different sizes.

17. In a machine for handling headed articles such as fasteners and the like, fastener supporting means comprising a pair of spaced members, said members having fastener engaging surfaces for cooperatively supporting the head of a fastener with its shank extending between the members, and means for adjusting the space between said members comprising a cam on said machine engageable with one of said members and having a plurality of positions of adjustment, each position being effective for spacing said members a different amount.

18. In a machine for handling headed articles such as fasteners and the like, fastener supporting means comprising a pair of substantially vertical spaced plates, the upper portions of said plates being provided with fastener engaging surfaces for cooperatively supporting the head of a fastener with its shank extending between the plates, one of said plates being fixed to the machine and the other plate being joined to said fixed plate remotely from said fastener engaging surfaces for swinging movement relatively to said fixed plate, means at all times urging said other plate away from said fixed plate, and a cam on said machine engageable with said other plate and having a plurality of positions of adjustment for displacing said other plate toward said fixed plate, each position being effective for spacing said plates a different amount.

19. In a machine for handling headed articles such as fasteners and the like, means for orienting fasteners with respect to their ends comprising a hopper for holding a supply of randomly oriented fasteners, an elongated fastener receiver in said hopper for suspending fasteners by their heads, means for agitating said hopper to cause the fasteners to enter said receiver, said receiver comprising a fixed wall member and a movable wall member, a fastener guideway for conducting fasteners away from said receiver, said guideway comprising a pair of spaced plates the upper portions of said plates being provided with fastener engaging surfaces contiguous with the wall members of said receiver, one of said plates being fixed to the machine and the other being movable relatively thereto, connecting means on said movable plate engageable with said movable wall member, means at all times urging said movable wall member away from said fixed wall member whereby said movable plate is also urged away from said wall plate, and cam means engageable with said movable plate to displace said movable plate toward said fixed plate and said movable wall member toward said fixed wall member to vary the size of said receiver and said guiding member in corresponding amounts.

20. In a fastener handling machine, a fastener guiding member, a fastener picker bar having a plurality of fastener engaging units of different sizes for accommodating fasteners of different sizes, relative movement between each fastener engaging unit and said guiding member effecting the separation of fasteners from said guiding member, and means for maintaining said fastener engaging units and said guiding member selectively in operative relationship thereby to accommodate a range of fastener sizes.

21. In a fastener handling machine, a fastener guiding member, a movable bar having a plurality of fastener picking notches of different sizes for accommodating fasteners of different sizes, relative movement between each notch and said guiding member effecting the separation of fasteners from said guiding member, and means for maintaining said picking notches and said guiding member selectively in operative relationship thereby to accommodate a range of fastener sizes.

22. In a fastener handling machine, a fastener guiding member, a bar having a plurality of fastener picking notches of different sizes for accommodating fasteners of different sizes, said picking notches being spaced about the axis of said bar, means for reciprocating said bar axially adjacent said guiding member, relative movement between each picking notch and said guiding member effecting the separation of fasteners from said guiding member, and means mounting said bar for adjustment about its axis for placing said notches selectively in fastener picking position thereby to accommodate a range of fastener sizes.

23. In a fastener handling machine, a fastener guiding member, a bar having a plurality of fastener picking notches of different sizes for accommodating fasteners of different sizes, said notches being spaced about the axis of said bar, means for reciprocating said bar axially adjacent said guiding member, relative movement between each picking notch and said guiding member effecting the separation of fasteners from said guiding member, means mounting said reciprocating means for pivotal movement on said machine about an axis extending transversely of the axis of said bar whereby said bar may be moved into and out of position adjacent said guiding member, and means mounting said bar for adjustment about its axis to place said notches selectively in fastener picking position thereby to accommodate a range of fastener sizes.

24. In a fastener handling machine, a fastener guiding member, a fastener picking member having a plurality of fastener engaging units of different sizes for accommodating fasteners of different sizes, relative movement between each engaging unit and said guiding member effecting the separation of fasteners from said guiding member, means for adjusting the size of said guiding member in increments corresponding to the sizes of said fastener engaging units, and means for maintaining said fastener engaging units and said guiding member selectively in operative relationship thereby to accommodate a range of fastener sizes.

25. In a fastener handling machine, means for orienting fasteners with respect to their ends, fastener guiding means for conducting fasteners away from said orienting means, a fastener picking member having a plurality of fastener engaging units of different sizes for accommodating fasteners of different sizes, relative movement between each engaging unit and said guiding member effecting the separation of fasteners from said guiding means, means for adjusting the size of the guiding means and the orienting means in increments corresponding to the sizes of the fastener engaging units, and means for maintaining said fastener engaging units and said guiding means selectively in operative relationship thereby to accommodate a range of given fastener sizes.

26. A light weight portable air-operated machine comprising a tubular skeleton frame of pipe providing a compressed air reservoir, an air-operated device carried by said frame, means for introducing air under pressure into said frame, and means for conducting the air in said frame to said device.

27. A light weight portable air-operated machine comprising a frame of pipe in a vertically arranged closed loop to form a reservoir for compressed air, the upper portion of said pipe frame providing a handle to facilitate moving the machine from one place to another, an air-operated device carried by said frame, means for introducing air under pressure into said frame, and means for conducting the air in said frame to said device.

28. A portable compressed air-operated machine comprising a supporting frame formed of spaced interconnected tubular side frame pipe members, at least one of said members providing a compressed air reservoir, an air-operated instrumentality carried by said frame, means connecting said one of said members to a source of compressed air, and means connecting said one of said members to said instrumentality for supplying operating air thereto.

References Cited in the file of this patent
UNITED STATES PATENTS

| | | |
|---|---|---|
| 396,611 | Scofield | Jan. 22, 1889 |
| 407,444 | Newman | July 23, 1889 |
| 464,200 | Nye | Dec. 1, 1891 |
| 1,703,458 | Ruff | Feb. 26, 1929 |
| 1,980,967 | De Mooy | Nov. 13, 1934 |
| 2,240,516 | Paxton | May 6, 1941 |
| 2,540,934 | Cook | Feb. 6, 1951 |
| 2,732,554 | Knott | Jan. 31, 1956 |
| 2,787,799 | Marasco | Apr. 9, 1957 |